(12) United States Patent
Asbury

(10) Patent No.: US 6,478,528 B1
(45) Date of Patent: Nov. 12, 2002

(54) MOBILE CRANE APPARATUS

(76) Inventor: George N. Asbury, 8641 Dog Branch Rd., Mount Pleasant, TN (US) 38474

( * ) Notice: Subject to any disclaimer, the term of this patent is extended or adjusted under 35 U.S.C. 154(b) by 2 days.

(21) Appl. No.: 09/641,843

(22) Filed: Aug. 18, 2000

(51) Int. Cl.$^7$ .................................................. B60P 1/54
(52) U.S. Cl. ........................ 414/550; 212/180; 414/543
(58) Field of Search ............................... 414/462, 543, 414/550; 224/519; 212/180, 901

(56) References Cited

U.S. PATENT DOCUMENTS

| 3,843,093 | A | | 10/1974 | Thompson et al. |
| 4,226,331 | A | * | 10/1980 | Dumond ..................... 212/258 |
| D288,912 | S | | 3/1987 | Lucas |
| 4,700,851 | A | * | 10/1987 | Reeve et al. ................ 212/180 |
| 4,881,864 | A | * | 11/1989 | Amato ........................ 414/543 |
| 5,211,526 | A | | 5/1993 | Robinette |
| 5,480,041 | A | | 1/1996 | Turner |
| 5,520,498 | A | | 5/1996 | Di Bartolomeo |
| 5,540,537 | A | | 7/1996 | Welch |
| 5,752,799 | A | * | 5/1998 | Carey et al. ................ 414/543 |
| 5,993,137 | A | * | 11/1999 | Harr ........................... 414/550 |
| 6,138,991 | A | * | 10/2000 | Myers, Jr. .................... 254/323 |

FOREIGN PATENT DOCUMENTS

| EP | 425733 | * | 5/1991 | ................ 212/180 |
| GB | 2239430 | * | 7/1991 | ................ 414/550 |

* cited by examiner

Primary Examiner—James W. Keenan

(57) ABSTRACT

A mobile crane apparatus for lifting and moving heavy objects as desired by the user. The mobile crane apparatus includes a base frame being adapted to securely mount to a hitch receiver mounted on a vehicle; and also includes a bearing member being mounted upon the base member; and further includes a crane base support member being mounted to the bearing member and being rotatably and lockingly mounted the base member; and also includes a lift and carry member securely mounted upon the crane base support member; and further includes base stabilizing members adjustably mounted to the base member.

1 Claim, 2 Drawing Sheets

MOBILE CRANE APPARATUS

BACKGROUND OF THE INVENTION

1. Field of the Invention

The present invention relates to a mobile lift and carry apparatus and more particularly pertains to a new mobile crane apparatus for lifting and moving heavy objects as desired by the user.

2. Description of the Prior Art

The use of a mobile lift and carry apparatus is known in the prior art. More specifically, a mobile lift and carry apparatus heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,211,526; 5,540.537; 5,520,498; 5,480,041; 3,843,093; and Des. 288, 912.

While these devices fulfill their respective, particular objectives and requirements, the aforementioned patents do not disclose a new mobile crane apparatus. The inventive device includes a base frame being adapted to securely mount to a hitch receiver mounted on a vehicle; and also includes a bearing member being mounted upon the base member; and further includes a crane base support member being mounted to the bearing member and being rotatably and lockingly mounted the base member; and also includes a lift and carry member securely mounted upon the crane base support member; and further includes base stabilizing members adjustably mounted to the base member.

In these respects, the mobile crane apparatus according to the present invention substantially departs from the conventional concepts and designs of the prior art, and in so doing provides an apparatus primarily developed for the purpose of lifting and moving heavy objects as desired by the user.

SUMMARY OF THE INVENTION

In view of the foregoing disadvantages inherent in the known types of mobile lift and carry apparatus now present in the prior art, the present invention provides a new mobile crane apparatus construction wherein the same can be utilized for lifting and moving heavy objects as desired by the user.

The general purpose of the present invention, which will be described subsequently in greater detail, is to provide a new mobile crane apparatus which has many of the advantages of the mobile lift and carry apparatus mentioned heretofore and many novel features that result in a new mobile crane apparatus which is not anticipated, rendered obvious, suggested, or even implied by any of the prior art mobile lift and carry apparatus, either alone or in any combination thereof.

To attain this, the present invention generally comprises a base frame being adapted to securely mount to a hitch receiver mounted on a vehicle; and also includes a bearing member being mounted upon the base member; and further includes a crane base support member being mounted to the bearing member and being rotatably and lockingly mounted the base member; and also includes a lift and carry member securely mounted upon the crane base support member; and further includes base stabilizing members adjustably mounted to the base member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new mobile crane apparatus which has many of the advantages of the mobile lift and carry apparatus mentioned heretofore and many novel features that result in a new mobile crane apparatus which is not anticipated, rendered obvious, suggested, or even implied by any of the prior art mobile lift and carry apparatus, either alone or in any combination thereof.

It is another object of the present invention to provide a new mobile crane apparatus which may be easily and efficiently manufactured and marketed.

It is a further object of the present invention to provide a new mobile crane apparatus which is of a durable and reliable construction.

An even further object of the present invention is to provide a new mobile crane apparatus which is susceptible of a low cost of manufacture with regard to both materials and labor, and which accordingly is then susceptible of low prices of sale to the consuming public, thereby making such mobile crane apparatus economically available to the buying public.

Still yet another object of the present invention is to provide a new mobile crane apparatus which provides in the apparatuses and methods of the prior art some of the advantages thereof, while simultaneously overcoming some of the disadvantages normally associated therewith.

Still another object of the present invention is to provide a new mobile crane apparatus for lifting and moving heavy objects as desired by the user.

Yet another object of the present invention is to provide a new mobile crane apparatus which includes a base frame being adapted to securely mount to a hitch receiver mounted on a vehicle; and also includes a bearing member being mounted upon the base member; and further includes a crane base support member being mounted to the bearing member and being rotatably and lockingly mounted the base member; and also includes a lift and carry member securely mounted upon the crane base support member; and further includes base stabilizing members adjustably mounted to the base member.

Still yet another object of the present invention is to provide a new mobile crane apparatus that allows the user to rotatably move the lift and move member about as desired to pick up heavy objects Even still another object of the present invention is to provide a new mobile crane apparatus that is easily and conveniently mounted to a hitch receiver mounted on a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
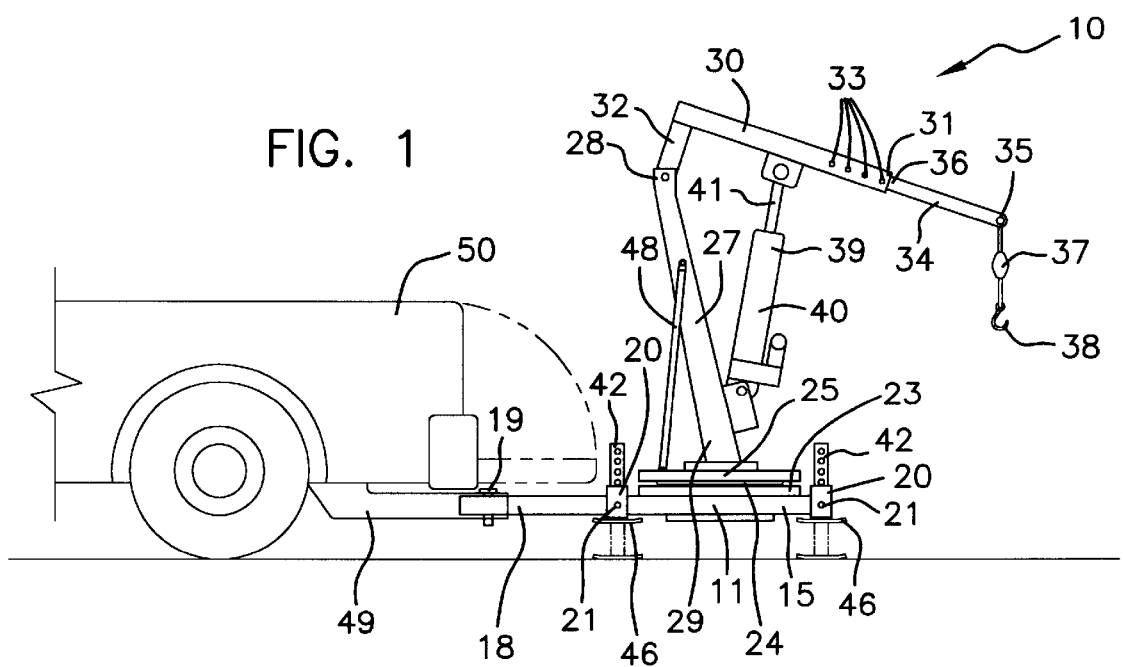
FIG. 1 is a side elevational view of a new mobile crane apparatus according to the present invention shown in use.
Figure 2:
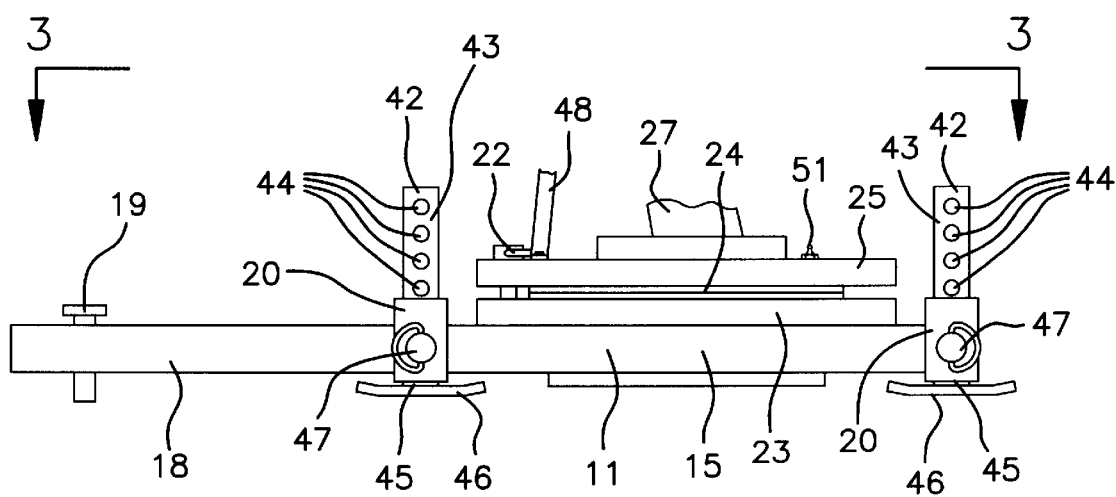
FIG. 2 is a detailed side elevational view of the base frame and the crane base support member of the present invention.
Figure 3:
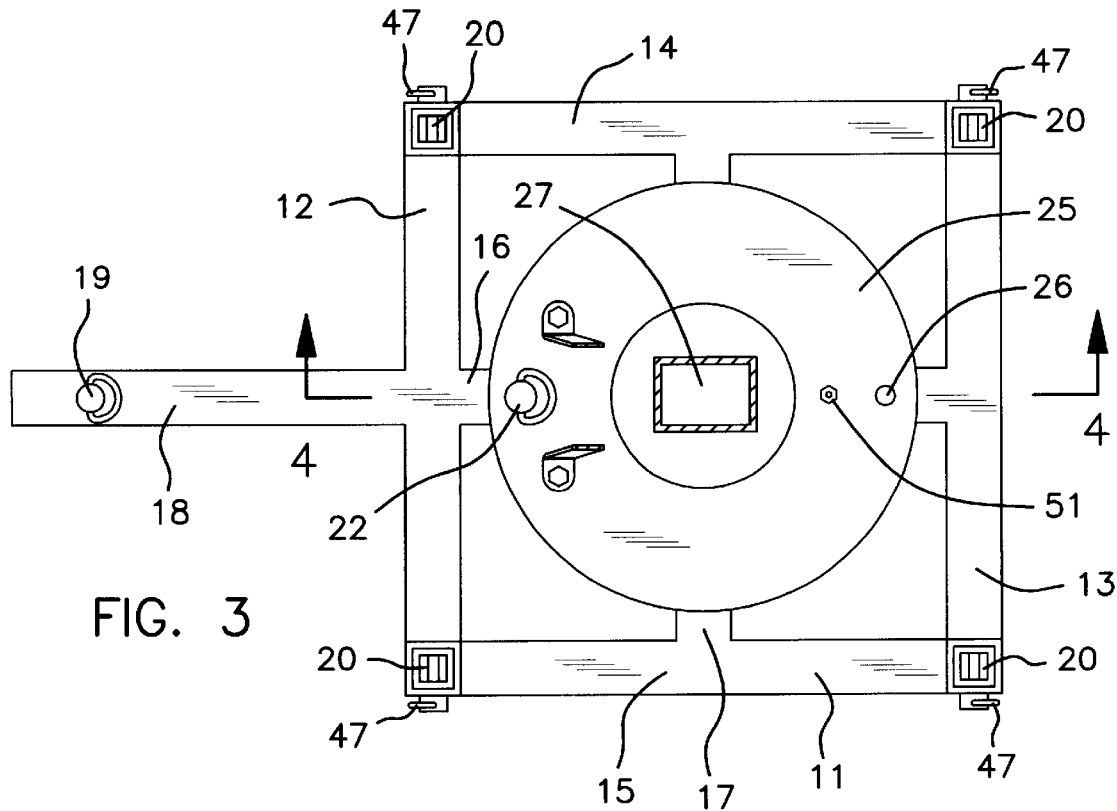
FIG. 3 is a top plan view of the base frame and the crane base support member of the present invention.
Figure 4:
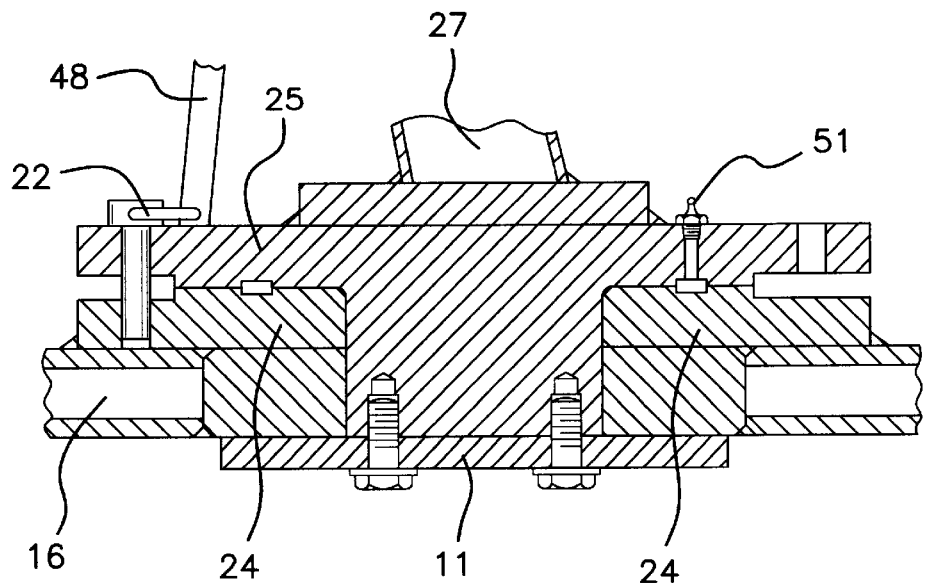
FIG. 4 is a cross-sectional view of the base frame and the crane base support member of the present invention.

With reference now to the drawings, and in particular to FIGS. 1 through 4 thereof, a new mobile crane apparatus embodying the principles and concepts of the present invention and generally designated by the reference numeral 10 will be described.

As best illustrated in FIGS. 1 through 4, the mobile crane apparatus 10 generally comprises a base frame 11 being adapted to securely mount to a hitch receiver 49 mounted to a vehicle 50. The base frame 11 includes a base member 12–17 having a plurality of sleeve-like members 20 being spaced apart and being securely and conventionally attached along a perimeter of the base member 12–17 and being vertically disposed. Each of the sleeve-like members 20 has a hole 21 extending through a wall thereof. The base frame 11 also includes an elongate extension member 18 securely and conventionally attached and welded to the base member 12 and extending therefrom and having an end portion which is adapted to be fastenably and removably received with a fastener 19 in the hitch receiver 49. The base frame 11 further includes a plate-like member 23 being securely and conventionally attached to and upon the base member 12–17. The base member 12–17 includes elongate side members 12,13, elongate end members 14,15 being securely and conventionally attached and welded to the elongate side members 12,13 and extending therebetween, and also including a first cross member 16 being securely and conventionally attached to the elongate side members 12,13 and extending therebetween, and further including a second cross member 17 being securely and conventionally attached to the elongate end members 14,15 and extending therebetween. The elongate extension member 18 is securely and conventionally attached and welded to one of the elongate side members 12.

A bearing member 24 is conventionally mounted upon the base member 12–17 with the bearing member 24 being securely attached to and upon the plate-like member 23. A crane base support member 25 is conventionally mounted to the bearing member 24 and is rotatably and lockingly mounted the base member 12–17 with the crane base support member 25 including holes 26 extending therethrough and also including a grease fitting 51 securely attached thereto and extending therethrough for greasing the bearing member 24 with the crane base support member 25 being securely fastenable to the plate-like member 23 with a fastener member 22.

A lift and carry member is securely and conventionally mounted upon the crane base support member 25. The lift and carry member includes an elongate base support member 27 having a first end 28 and a second end 29 which is securely and conventionally mounted and bolted upon the crane base support member 25 and which extends upwardly therefrom, and also includes a first boom member 30 having an open first end 31 and a second end 32 which is hingedly and conventionally attached to the first end 28 of the elongate base support member 27 with the first boom member 30 having a plurality of holes 33 spaced along and extending through a wall of the first boom member 30, and further including a second boom member 34 which has a first end 35 and a second end 36 which is telescopingly and fastenably received through the first end 31 of the first boom member 30, and also including a cord 37 having a hook member 38 securely suspended therefrom with the cord 37 being securely and conventionally fastened to the first end 35 of the second boom member 34. The lift and carry member further includes a hydraulic ram 39 being securely and conventionally attached to the elongate crane support member 27 and to the first boom member 30 for raising and lowering the first and second boom members 30,34. The hydraulic ram 39 includes a hydraulic cylinder 40 and a ram member 41 movably extended from the hydraulic cylinder 40. The lift and carry member further includes brace members 48 having ends securely and conventionally attached and bolted to the elongate crane support member 27 and to the crane base support member 25 for stabilizing and securing the elongate crane support member 27.

Base stabilizing members are adjustably mounted to the base member 12–17. The base stabilizing members include a plurality of leg members 42 each having a plurality of holes 44 extending therein and being spaced along an upper portion 43 of the leg member 42 and each being movably extended through and fastenably attached to a respective sleeve-like member 20 with a fastening member 47, and also including a plurality of feet members 46 each of which is securely and conventionally attached to a bottom end 45 of a respective leg member 42.

In use, the elongate extension member 18 is inserted into and fastened with the fastener 19 to the hitch receiver 49 mounted to a pickup truck 50. The mobile crane apparatus 10 is ideally used to pick up and move objects such as engines and auto parts. The first and second boom members 30,34 are lowered by letting the pressure out of the hydraulic ram 39 which allows the ram member 41 to lower into the hydraulic cylinder 40 which lowers the first and second boom members 30,34. The user connects the hook member 38 to the object to be lifted and carried and then pumps the hydraulic ram 39 so that the ram member 41 is urged out of the hydraulic cylinder 40 to lift the object.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A mobile crane apparatus comprising:
   a base frame being adapted to securely mount to a hitch receiver, said base frame being substantially rectangular with four corners;
   an elongate extension member mounted on said base frame and extending away from said base frame, said extension member having an end portion located opposite said base frame for insertion into a hitch receiver of a vehicle, said extension member having a longitudinal axis;
   a bearing member being mounted upon said base frame;
   a crane base support member being mounted to said bearing member and being rotatably and lockingly mounted to said base frame, said crane base support member being positioned at a substantially central location on said base frame with respect to said four corners;
   a lift and carry member securely mounted upon said crane base support member; and
   four base stabilizing assemblies each being mounted to said base frame near one of said corners of said base frame, a pair of said base stabilizing assemblies being located on each lateral side of said longitudinal axis of said extension member;
   wherein said base stabilizing assemblies each include a sleeve member being attached along a perimeter of said base frame and being vertically disposed, each of said sleeve members having a hole extending through a wall thereof;
   wherein said elongate extension member has a length permitting a tailgate of the vehicle to be moved into a lowered, substantially horizontal position without extending over said base frame when said extension member is mounted on the hitch receiver of a vehicle;
   wherein said base frame further includes a plate member securely attached to and upon said base frame;
   wherein said base frame includes elongate side members, elongate end members being attached to said elongate side members and extending therebetween, and also includes a first cross member being attached to said elongate side members and extending therebetween, and further includes a second cross member being attached to said elongate end members and extending therebetween, said elongate extension member being attached to one of said elongate side members;
   wherein said bearing member is attached to and upon said plate member;
   wherein said lift and carry member includes an elongate base support member having a first end and a second end which is securely mounted upon said crane base support member and which extends upwardly therefrom, and also includes a first boom member having an open first end and a second end which is hingedly attached to said first end of said elongate base support member, and further includes a second boom member which has a first end and a second end which is telescopingly received through said first end of said first boom member;
   wherein said lift and carry member further includes a hydraulic ram being securely attached to said elongate crane support member and to said first boom member for raising and lowering said first and second boom members;
   wherein said lift and carry member further includes at least one brace member having ends attached to said elongate crane support member and to said crane base support member for stabilizing and securing said elongate crane support member;
   wherein said crane base support member includes holes extending therethrough and is securely fastenable to said plate member with a fastener member, said crane support member further having a grease fitting securely attached thereto and extending therethrough for greasing said bearing member;
   wherein said base stabilizing assemblies each include a leg member having a plurality of holes extending therein and being spaced along an upper portion of said leg member and each being movably extended through and fastenably attached to a hole formed in a respective said sleeve member with a fastening member, and also includes a foot member attached to a bottom end of each of said leg members; and
   wherein a transverse axis extends substantially perpendicular to said longitudinal axis of said extension member, said transverse axis passing through said crane base support member, a pair of said base stabilizing assemblies being located on a side of said transverse axis in which said extension member is located, and a pair of said base stabilizing assemblies being located on an opposite side of said transverse axis from said extension member.

* * * * *